Sept. 27, 1960 R. C. PARKES Re. 24,871

DRYING MACHINE

Original Filed Aug. 13, 1956 3 Sheets-Sheet 1

INVENTOR.
RALPH C. PARKES

BY Louis Neeb

ATTORNEY

DRYING MACHINE

Original Filed Aug. 13, 1956 3 Sheets-Sheet 2

INVENTOR.
RALPH C. PARKES
BY Louis Neeb
ATTORNEY

DRYING MACHINE

Original Filed Aug. 13, 1956 3 Sheets-Sheet 3

INVENTOR.
RALPH C. PARKES
BY Louis Neeb
ATTORNEY

United States Patent Office

Re. 24,871
Reissued Sept. 27, 1960

24,871

DRYING MACHINE

Ralph C. Parkes, Glenside, Pa.

Original No. 2,884,711, dated May 5, 1959, Ser. No. 603,501, Aug. 13, 1956. Application for reissue Sept. 17, 1959, Ser. No. 840,784

3 Claims. (Cl. 34—156)

Matter enclosed in heavy brackets [ ] appears in the original patent but forms no part of this reissue specification; matter printed in italics indicates the additions made by reissue.

My invention relates to a machine of the type which may be used for drying, or for otherwise processing cloth, or other sheet material, by subjecting it to the action of the desired fluid medium. For example, heated air and/or steam may be used for drying and/or curing or setting, and chemical reagents can be used for color fixing or for color development and so on.

Because the nature of the operation performed, and the nature of the material treated, have no bearing on the machine, or on the manner of operation, hereinafter described, reference will only be made to the drying of cloth by means of heated air. This is by way of example only and it is understood that "drying" includes other treatments; that "cloth" includes other materials and that "air" includes other media.

One method of drying cloth consists in discharging heated air against one or both sides of the cloth while the cloth is held in, or is moved through, a drying chamber and, assuming the temperature and relative humidity to be constant, the volume and velocity of the air must be regulated as may be indicated for example, by the thickness of the cloth, by its moisture content, by the degree of drying desired and by the rate of movement of the cloth through the drying chamber and so on.

It is therefore one object of the invention to produce improved, adjustable, primary nozzles whereby the volume and velocity of the air [discharge] *discharged* against the cloth may be readily regulated so as to produce optimum results in the quantity and in the quality of the finished product.

During the drying operation, a positive air pressure prevails in the vicinity of the cloth and a corresponding negative pressure prevails in the part of the drying chamber from which spent air is withdrawn for reconditioning and recirculation or for exhaust. Because of structural limitations, and other variable factors, the air pressure potential is not uniform and when cloth is slack-dried it tends to wander and it frequently gets air creased with correspondingly defective drying.

It is therefore a further object of the invention to produce improved adjustable, secondary nozzles whereby the positive air pressure in the vicinity of the cloth may be accurately regulated so as to produce uniform drying and to prevent creasing, shading and so forth.

The nature of the invention is more fully disclosed in the following specification and in the accompanying drawings in which.

Figure 1:
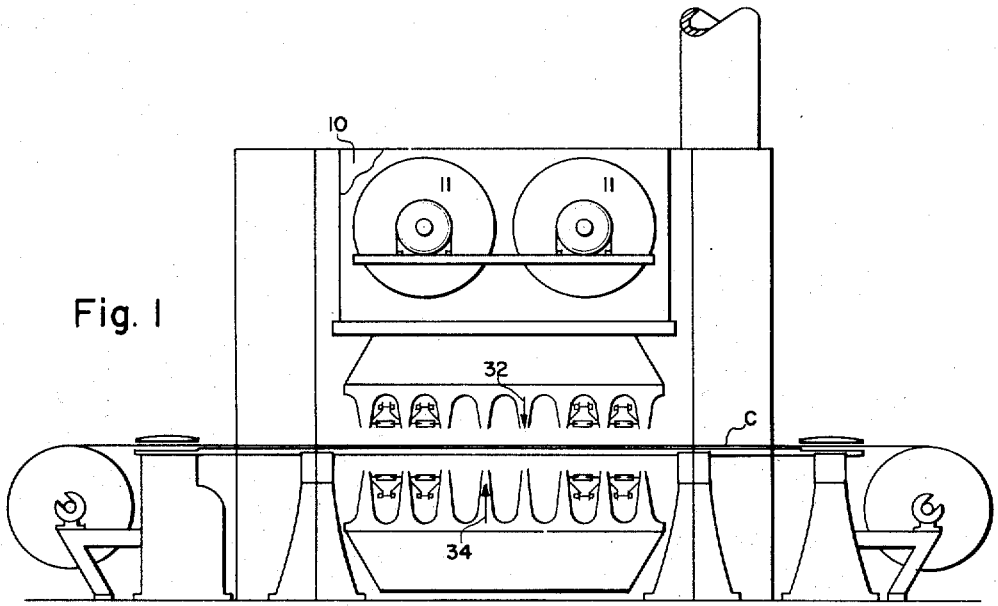
Fig. 1 is a highly diagrammatic, single line, elevational view of a machine embodying the invention and shown as used for drying cloth.
Figure 2:
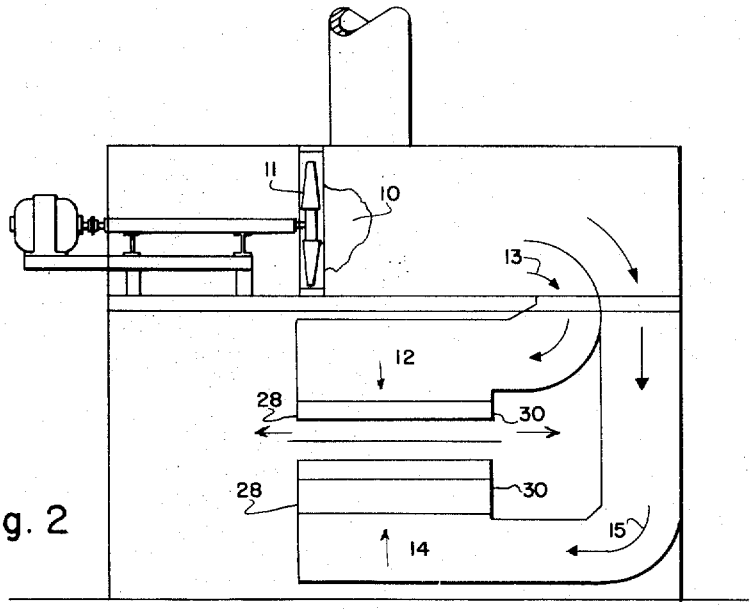
Fig. 2 is a highly diagrammatic, single line, elevational view of the same.

The machine illustrated includes a plenum 10 which is supplied with heated air by means of blowers 11. Plenum 10 communicates with an upper nozzle chamber 12, as shown by arrow 13, and it communicates with a lower nozzle chamber 14, as indicated by arrow 15.

Except for facing in opposite directions, the nozzles in upper and lower chamber 12 and 14 are formed by means of identical, generally U-shaped ducts 16, 18 and 20, and 22, 24 and 26, respectively, which ducts extend from one end wall 28 to the other end wall 30 of each of the upper and lower chambers so that the lengths of the ducts will equal the width of the widest cloth C to be dried in the machine. The ducts 16, 18, 20, 22, 24 and 26 are either formed integrally with their respective chambers or they are suitably secured in position by means, not shown.

Figure 3:
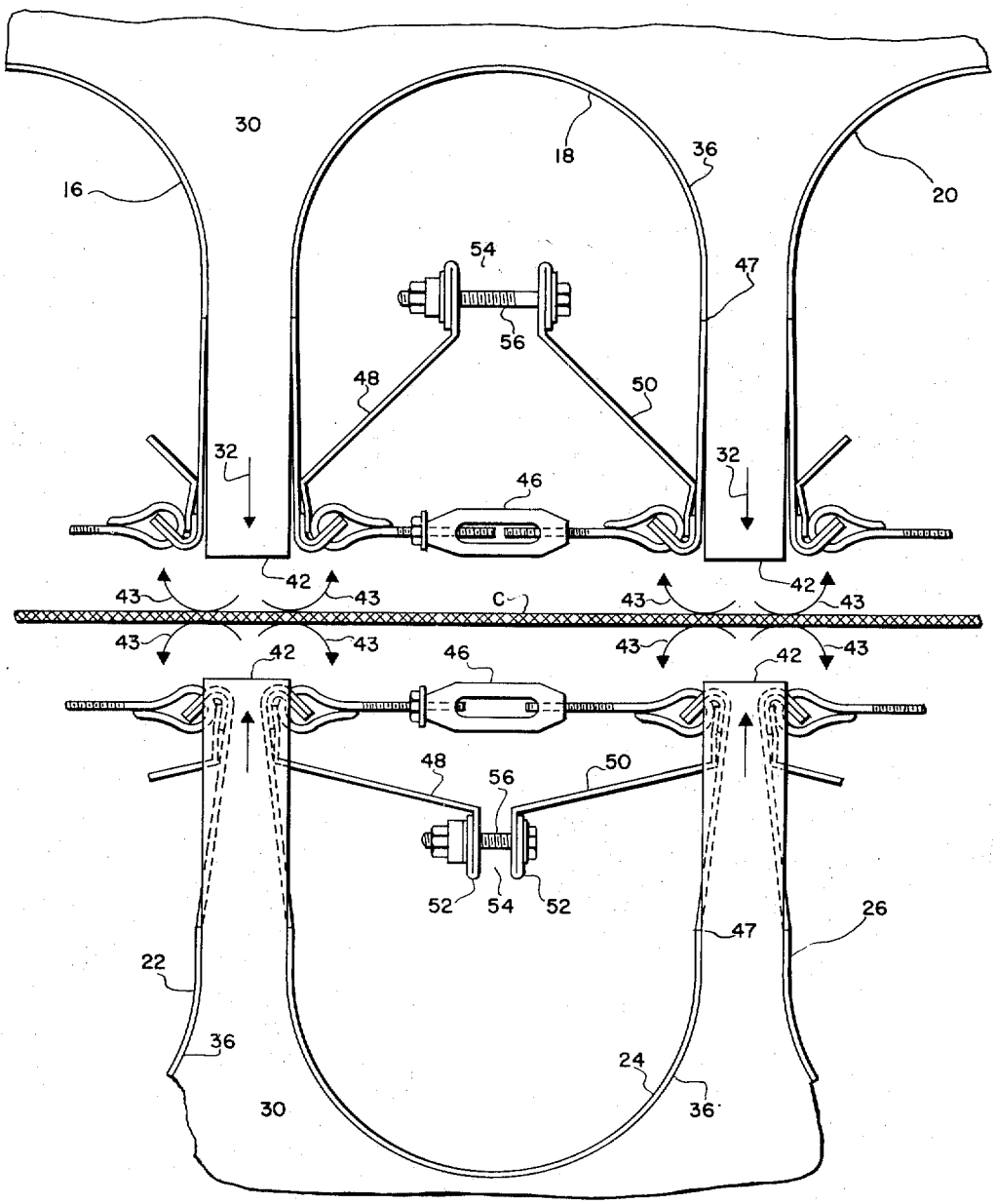
Fig. 3 is a greatly enlarged, vertical sectional view showing details of construction.

As best shown in Figs. 3, the ducts in upper and lower chambers 12 and 14 are spaced and the spaces there between provide air discharge nozzles through which the heated air is discharged against the cloth in the direction of arrows 32 and 34. The opposite end walls 28 and 30 of chambers 12 and 14 are cut out as at 36 so that the opposite ends of the ducts open into the adjacent portions of the drying chamber. The ends of the nozzles formed by the spaces between adjacent ducts are closed by portions 40 and 42 of end plates 28 and 30, respectively, which are left after said end plates are cut out as at 36. By this arrangement, air reaching upper chamber 12 will flow downwardly between the sides of adjacent ducts 16, 18 and 20, etc. and corresponding wall portions 40 and 42, as shown by arrows 32, and air reaching lower chamber 14 will flow upwardly between the sides of ducts 22, 24 and 26, etc. and corresponding wall portions 40 and 42, as shown by arrows 34.

In order to regulate the volume and velocity of the heated air, I make provision for increasing or decreasing the spaces between the juxtaposed side walls of adjacent ducts to enlarge or to restrict the nozzle formed by said sides. In the preferred embodiment, this is accomplished by means of turnbuckles 46 which engage the opposite sides of each duct, in the manner illustrated in Fig. 3. To permit movement of the sides of the ducts, in response to the action of the turn buckles, the ducts can be made of flexible material throughout, or the rectilinear marginal portions, which are the only parts which need to be moved, can be hinged to the U-shaped bodies of the duct as at 47. The air discharged against the opposite sides of cloth C flows in the direction of arrows 43 into the juxtaposed ducts and, in the absence of my invention, the air will flow through the opposite open ends of the ducts into the drying chamber from which the air is removed by blowers 11 *to the suction side of said blowers.*

In order to control the flow of the heated air from the vicinity of the cloth to the drying chamber through the upper and lower ducts, I provide each of said ducts with baffles 48 and 50 which are co-extensive with the ducts and the pendent ends 52 of which are spaced apart by bolts 56 to form outlets 54. By this arrangement, the air discharged through the spaces between the ducts can only flow from the drying chamber through opening 54. By manipulating bolts 56 in a direction to move the ends 52 of baffles 48 and 50 apart, the rate of flow of air from the vicinity of the cloth being dried will be increased, as shown in duct 18, and vice versa as shown in duct 24.

Figure 4:
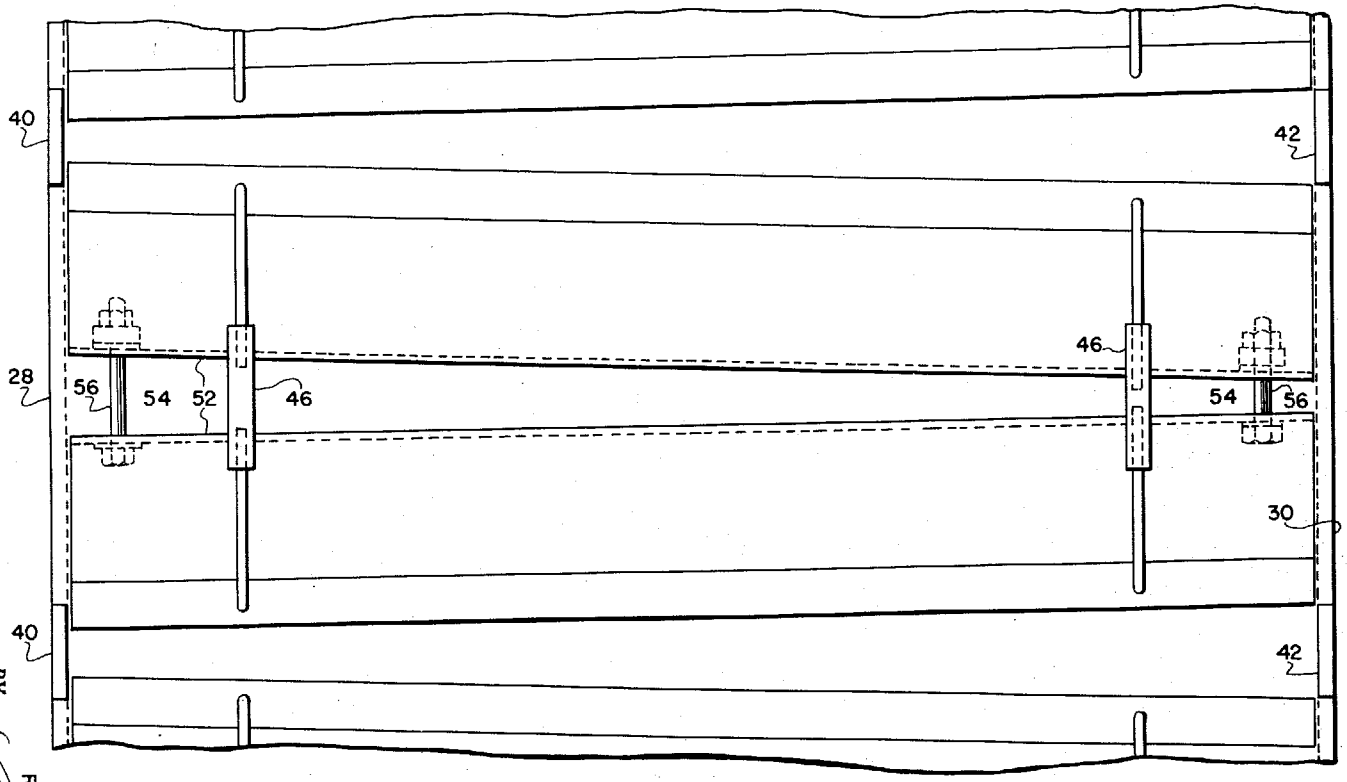
Fig. 4 is an enlarged, fragmentary plan view showing other details of construction.

From Fig. 4, [is] *it* will be seen that the baffles in each duct have two adjustments, one near each end. By this means the effect of the heated air on the cloth being dried can be varied as indicated by the progress of the drying operation. For example, if the portion of the cloth which registers with one end of a duct is drying too fast, the corresponding outlet 54 is enlarged to expedite removal of the heated air from the vicinity of that portion of the cloth and vice versa. This provides a control which is in addition to the controls which are exercised by adjusting the air discharge nozzles or by regulating the speed of movement of the cloth or by adjusting the distance between the cloth and the opposite banks of air discharge nozzles.

From the foregoing, it will be seen that, by my invention the volume and velocity of the air discharged against the cloth, as well as the volume and velocity of the air exhausted from the vicinity of the cloth can be regulated as may be indicated by their coaction on the cloth or by other conditions. For example, if it is desired to equalize the air pressure, openings 54 are enlarged, or restricted, according to the rate at which air is discharged against the cloth. To expedite the operation without any regard for other factors, openings 54 are enlarged to the fullest extent. Again, if it is found that chemical reagents are acting for too long a time on the cloth openings 54 will be enlarged and vice versa.

Thus, the provision of primary control of the air through manipulation of buckles 46 and the provision of a secondary control by manipulation of bolts 56 makes it possible to balance a balanced system with extreme accuracy and make better control of the drying operation possible in balanced and in unbalanced systems.

What I claim is:

1. In a drying chamber, at least one plenum, [means] *blowers* for supplying fluid under pressure to said plenum, generally U-shaped ducts arranged in spaced parallel relation, with the bight portions of said ducts facing said plenum and with the limbs of said ducts extending away from said plenum, means coacting with the juxtaposed limbs of adjacent ducts to form elongated nozzles communicating with said plenum and forming passages for the discharge of fluid from said plenum, the ends of said ducts being [opened] *open* and communicating with [said plenum] *the suction side of said blowers,* means for propelling the material to be dried past said nozzles transversely of the path of flow of said fluid, pairs of baffles carried by the opposite inner faces of each of said ducts, the inner marginal portions of said baffles being spaced and bent to form spaced parallel flanges forming fluid flow passageways leading through the ends of said ducts to *the suction side of* said [plenum], *blowers* and means for varying the spaces between said flanges to vary the size of said passageways to regulate the rate of flow of said fluid *away* from the vicinity of the material to be dried [to said plenum] thereby to control the volume of fluid acting on said material as well as the length of time during which said fluid may act on said material.

2. In a drying chamber, at least one plenum, [means] *blowers* for supplying fluid under pressure to said plenum, generally U-shaped ducts arranged in spaced parallel relation, with the bight portions of said ducts facing said plenum and with the limbs of said ducts extending away from said plenum, means coating with the juxtaposed limbs of adjacent ducts to form elongated nozzles communicating with said plenum and forming passages for the discharge of fluid from said plenum, the ends of said ducts being [opened] *open* and communicating with [said plenum] *the suction side of said blowers,* means for propelling the material to be dried past said nozzles transversely of the path of flow of said fluid, pairs of baffles within said ducts, the inner edges of said baffles being spaced to form fluid flow passageways leading through the ends of said ducts to *the suction side of* said [plenum] *blowers* and means for varying the spaces between said edges to vary the size of said passageways to regulate the rate of flow of said fluid *away* from the vicinity of the material to be dried [to said plenum] thereby to control the volume of fluid acting on said material as well as the length of time during which said fluid may act on said material.

3. The apparatus recited in claim 2 in which the walls of said ducts are flexible and means within said ducts for moving the opposite walls of individual ducts toward, or away from, each other to vary *the flow capacity of* said fluid discharge nozzle forming spaces to control the volume and velocity of the fluid discharged through said nozzles against said material.

References Cited in the file of this patent or the original patent

UNITED STATES PATENTS

| | | |
|---|---|---|
| 1,327,452 | Williams | Jan. 6, 1920 |
| 1,590,417 | Brunk | June 29, 1926 |
| 1,759,804 | Pieron | May 20, 1930 |
| 1,994,220 | Hormel | Mar. 12, 1935 |
| 2,225,505 | Offen | Dec. 17, 1940 |
| 2,700,226 | Dungler | Jan. 25, 1955 |

FOREIGN PATENTS

| | | |
|---|---|---|
| 432,456 | France | Oct. 5, 1911 |